(12) United States Patent
Wieczorek et al.

(10) Patent No.: US 9,646,004 B2
(45) Date of Patent: May 9, 2017

(54) HIERARCHICAL DATABASE REPORT GENERATION WITH AUTOMATED QUERY GENERATION FOR PLACEHOLDERS

(71) Applicant: Software AG, Darmstadt (DE)

(72) Inventors: Michael Wieczorek, Dillingen (DE); Torsten Haase, Saarbrücken (DE)

(73) Assignee: SOFTWARE AG, Darmstadt (DE)

(*) Notice: Subject to any disclaimer, the term of this patent is extended or adjusted under 35 U.S.C. 154(b) by 522 days.

(21) Appl. No.: 14/155,693

(22) Filed: Jan. 15, 2014

(65) Prior Publication Data

US 2015/0199346 A1    Jul. 16, 2015

(51) Int. Cl.
*G06F 17/00* (2006.01)
*G06F 17/30* (2006.01)

(52) U.S. Cl.
CPC .. *G06F 17/30011* (2013.01); *G06F 17/30991* (2013.01)

(58) Field of Classification Search
CPC ............... G06F 3/04842; G06F 3/0482; G06F 17/2247; G06F 3/04845; G06F 17/212; G06F 3/04847
See application file for complete search history.

(56) References Cited

U.S. PATENT DOCUMENTS

| | | | |
|---|---|---|---|
| 2002/0036662 A1* | 3/2002 | Gauthier | G06F 17/246 715/835 |
| 2004/0221233 A1 | 11/2004 | Thielen | |
| 2014/0337815 A1* | 11/2014 | Erlewein | G06F 8/30 717/106 |

OTHER PUBLICATIONS

Software AG Government Solutions—ARIS Business Architect & Designer, Copyright 2013, retrieved online Oct. 5, 2015, 4 pages. http://www.softwareaggov.com/uploads/files/SAG_GS_ARIS_BusArchDesign_FS_Jan 13_Web.pdf.
Docmosis Creating Templates, retrieved online Oct. 5, 2015, 2 pages. https://www.docmosis.com/how-it-works/creating-templates.html.
Winward AutoTag, Jan. 12, 2013, 2 pages. https://web.archive.org/web/20130112033118/http://www.windward.net/autotag.php.
Jaspersoft Ultimate Guide—JasperReports Library, Copyright 2011, retrieved online Oct. 5, 2015, 333 pages. http://jasperreports.sourceforge.net/JasperReports-Ultimate-Guide-3.pdf.
SAP Crystal Solutions, Copyright 2011, retrieved online Oct. 5, 2015, 12 pages. https://web.archive.org/web/20130115084951/http://download.sap.com/solutions/sapbusinessobjects/sme/reporting-dashboarding/brochures/download.epd?context=E53588737E30B0E6DA7683F1B57D0385033DDD4623D2609ED4C5C504ECC5B4E3A97F8A3F77BDF2E4A705A6DA8A65701D69ECC64ABCBA62FA.

* cited by examiner

*Primary Examiner* — Truong Vo
(74) *Attorney, Agent, or Firm* — Nixon & Vanderhye PC

(57) ABSTRACT

A computerized method, implemented in at least one processor, for automatically generating a report, the method including, receiving, by the at least one processor, a document that includes placeholders arranged in a layout, reading, by the at least one processor, the placeholders, mapping, by the at least one processor, the placeholders to respective executable queries, executing, by the at least one processor, a search of a database using the executable queries to retrieve information from the database, mapping, by the at least one processor, the information from the database to the layout, and generating an updated document that includes the information retrieved from the database arranged in a layout defined by the layout of the placeholders.

30 Claims, 15 Drawing Sheets

| Placeholders in your document | Data | Document |
|---|---|---|
| ProcessModels | SELECT Model FROM Database WHERE Type IN ("A,B,C") | Title of the document |
| Creator | SELECT Attribute "Creator" FROM Model | Content... |
| CreationDate | (Not defined) | Introduction... |
| AttributeList | (Not defined) | Models... Model name: <<Name>> |
| AttributeList | (Not defined) | Introduction Some introduction text |
| Attribute type | (Not defined) | Models: <<ProcessModels>> Model name: <<Name>> |
| Value | (Not defined) | Creator: <<Creator>> CreationDate: <<CreationDate>> |
| Functions | SELECT Object FROM Model WHERE Type=... | Attributes: <<Attribute List>> |
| Name | SELECT Attribute "Name" FROM Object | More detailed list of attributes <<Attribute List>> |
| Group | (Not defined) | <<Attribute List.Index>>. <<Attribute Type>>: <<value>> |
| Creator | (Not defined) | <<Attribute List_End>> |
| Description | (Not defined) | Functions executed in the model |
| Model-graphic | (Not defined) | |

FIG. 5

| Placeholders in your document | Data | Document |
|---|---|---|
| ProcessModels | SELECT Model FROM Database WHERE Type IN {"A,B,C"} | Title of the document |
| Creator | SELECT Attribute "Creator" FROM Model | Content<br>Content...<br>Introduction<br>Some introduction text<br>Models<br>Model name: <<Name>><br><br>Introduction<br>Some introduction text<br><br>Models<br><<ProcessModels>><br>Model name: <<Name>><br><br>Creator: <<Creator>><br>CreationDate: <<CreationDate>><br>Attributes<br>More detailed list of attributes<br>* <<AttributeList>><br><<AttributeList>><br><<AttributeList.index>> <<Attribute Type>> : <<value>><br><<AttributeList.End>><br><br>Functions executed in the model: |
| CreationDate | (Not defined) | |
| AttributeList | SELECT ALL Attribute FROM Model | |
| Attribute type | (Not defined) | |
| Value | (Not defined) | |
| Functions | SELECT Object FROM Model WHERE Type=... | |
| Name | SELECT Attribute "Name" FROM Object | |
| Group | (Not defined) | |
| Creator | (Not defined) | |
| Description | (Not defined) | |
| Model-graphic | (Not defined) | |

FIG. 6

| Keyword | Description | Example |
|---|---|---|
| <<placeholder>> | Enclosing characters to mark placeholder | <<Model>> |
| placeholder_end | Placeholder suffix to mark end of a region | <<Model>> ... <<Model_end>> |
| <<#condition:...>> <<#condition_end>> | Condition | <<Model>> ... <<#condition:[Model.]length=0>> No models! <<#condition_End>> <<#condition:[Model.]length>0>> Model name: <name> <<#condition_End>> <<Model_end>> |
| [placeholder.]length | Amount of the list corresponding to a region | <<#condition:[Model.]length=0>> |
| [placeholder.]index | Index of the list corresponding to a region | <<#condition:[Model.]index=0>> |
| << placeholder:merged>> | Placeholder suffix to cause the cells to be vertically merged | |
| graphic-placeholder:[stretch\|fit\|split] | Only for graphics, Formatting information: stretch image to graphic size, fit image to graphic size or split image to images of the given size. | |

*FIG. 10*

| A1 | B1 | C1 |
|----|----|----|
| A2 | B1 | C2 |
| A3 | B2 | C2 |

FIG. 12

| A1 | B1 | C1 |
|----|----|----|
| A2 |    | C2 |
| A3 | B2 |    |

HIERARCHICAL DATABASE REPORT GENERATION WITH AUTOMATED QUERY GENERATION FOR PLACEHOLDERS

FIELD OF DISCLOSED SUBJECT MATTER

At least some of the embodiments of the subject matter disclosed herein relate to the field of user interfaces and databases.

BACKGROUND AND SUMMARY

Current application systems typically work with large amounts of structured data, usually stored in databases. Accessing this data can be costly and complicated, typically requiring a skilled user even to perform simple tasks. For example, information contained in a database can be included in a report that is generated using JavaScript. However, this typically requires intimate knowledge of the JavaScript language to obtain the desired report. Alternatively, pre-programmed report types can be distributed with the database, but this approach can be inflexible and typically does not permit the user any ability to customize the report. Reports can also be generated using specialized design tools, but such tools typically require some knowledge of the internal data structures in order to create the appropriate query.

A computerized method, implemented in at least one processor, for automatically generating a report, the method including, receiving, by the at least one processor, a document that includes placeholders arranged in a layout, reading, by the at least one processor, the placeholders, mapping, by the at least one processor, the placeholders to respective executable queries, executing, by the at least one processor, a search of a database using the executable queries to retrieve information from the database, mapping, by the at least one processor, the information from the database to the layout, and generating an updated document that includes the information retrieved from the database arranged in a layout defined by the layout of the placeholders.

Various aspects of the disclosed subject matter can provide one or more of the following capabilities. A user can design a custom report with desired formatting more easily than with prior techniques. A user can design a report template with desired formatting using placeholders in a document. A database report template can be designed using a word processing application. A report template can contain arbitrary placeholders that are mapped to database queries. A data mapper can scan the report template to extract placeholders. A user (or other role) can interactively map/assign/correlate placeholders to database queries. A data mapper can be used to link placeholders to appropriate queries. The data retrieved from database queries can replace placeholders in a completed report. These and other capabilities of the disclosed subject matter will be more fully understood after a review of the following figures, detailed description, and claims.

BRIEF DESCRIPTION OF THE FIGURES

The following figures are presented for the purpose of illustration only, and are not intended to be limiting.

FIGS. 5-6 show exemplary data mapper interfaces.

FIG. 10 is a table listing exemplary syntax that can be used in a report template.

FIGS. 12-13 show how cells inside of a table can be merged, e.g., using a placeholder command and in connection with an example table.

DETAILED DESCRIPTION

Figure 1:
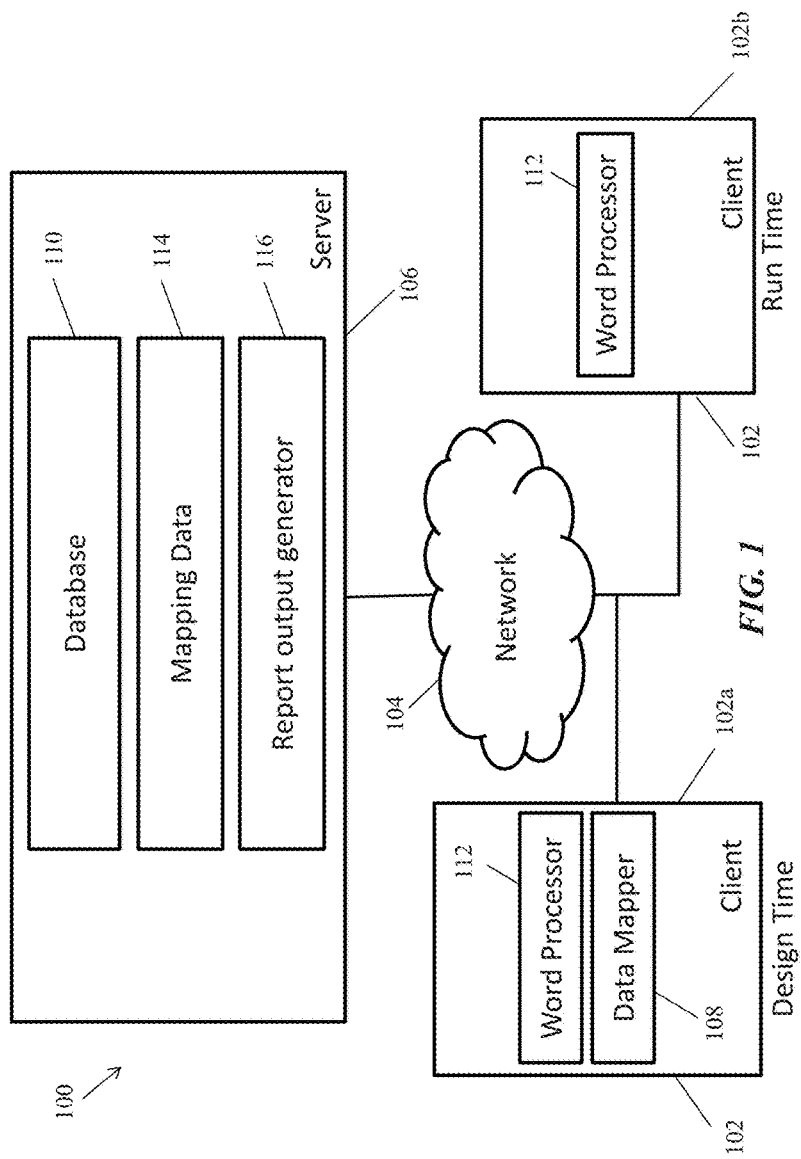
FIG. 1 provides an exemplary computer system that can be used to implement embodiments of the disclosed subject matter.

Embodiments of the subject matter disclosed herein can provide techniques to generate a completed report from a report template that includes human readable placeholders instead of actual database queries. For example, using a word processing program, a user can design a report template that includes desired formatting. Included in the report template are human readable placeholders that represent places where the user wishes to insert information that is stored in a database. A data mapper can scan the report template for placeholders and provide an interface allowing the placeholders to be mapped to executable queries, which are then executed against a database to retrieve the desired information. The retrieved information then replaces the placeholders in the report template to generate a completed report. Typically, the data retrieved from the database will be presented according to the formatting of the report template. Other embodiments are within the scope of the disclosed subject matter.

Database systems are powerful tools that allow people and/or companies to dynamically store and use vast quantities of information. While powerful, database systems can be difficult to use because they require the operator to have specific knowledge about how the database is configured and implemented. For example, a programmer typically should be familiar with the structure of the database, the protocol used to access the database, and the operation of the program that ultimately receives the data from the database.

Typically, when a user wishes to access information in the database, the user will execute a query. After executing the query, a report can be generated that includes the information requested by the query. In general, reports can be generated using either predefined templates provided by database access software, or by an administrator with intimate knowledge of the database itself. However, defining a query and the format of the finished report can be difficult for those who do not have specific knowledge about, for example, the structure and content of the database.

Thus, in some embodiments of the subject matter disclosed herein, a user can be provided with techniques for defining a report using a word processing application without requiring intimate knowledge about how the database is structured and/or functions. For example, a user can design a report template that contains the desired formatting, structure, and layout using MICROSOFT WORD. The user can also include one or more placeholders in the report template that are later used to retrieve information from the database and automatically populate the report template to create a completed report. In this way, the user can avoid working with unfamiliar tools or inflexible queries while defining the desired report layout in a standard word processing tool.

In some embodiments, the system can be arranged in a split-role architecture. For example, a template developer (e.g., a user) can use arbitrary names for placeholders in a report template. Then, at a later step, the semantic for corresponding database queries can be added by, for example another role (e.g., another individual, entity, or system). The original user that created the report template is not required to know about the queries used to access the database and/or the structure of the database itself (e.g., the user does not need to know about any parent/child relationships that may exist and can use his or her own words to define what the result should be). Thus, in this exemplary architecture another role (e.g., an administrator) can determine what the template designer intended with the placeholder name. In other words, the process of creating a report template and corresponding queries can be split into two-phases, one where a report template is created by a user that lacks knowledge about the database and query structure, and another phase where the report template is mapped to individual queries based on the placeholders (e.g., by someone with knowledge about the database).

The resulting query can have varying complexity (e.g., not only top-down). For example, given an employee database with the following name, address, and position information:

[Name, Street, City, Country, Phone]
[Name, Position, Boss], a designer can insert a field called "all countries for boss," which can represent a placeholder for an overview of the countries where the employees of a certain "boss" work. The user can create this placeholder without worrying about how to find this information in the database. In a later step, the user or another role can define the query corresponding to how to retrieve the information represented by the placeholder "all countries for boss":

[SELECT ALL Name BY Boss]+[SELECT ALL Country BY Name]

Referring to FIG. 1, an exemplary computer system 100 that can be configured to implement the functionality described herein is shown. The system 100 includes client computers 102, a server 106, a database 110, all of which can be connected to a network 104. The client 102 can be configured to provide a data mapper 108 and a word processing application 112. While FIG. 1 shows the data mapper 108 as part of the client 102 (e.g., as shown in client 102a), this is not required. For example, the data mapper 108 can be remote to the client 102, can be included in the server 106, and/or can be included in the word processing application 112, if desired.

The clients 102 can be, for example, local, remote, or a combination thereof to the server 106. The clients 102 can be, for example, interactive smart phones, tablet devices, PDAs, desktop computers, laptop computers, servers, other computers, or other devices coupled via a wireless or wired connection to network 104. The clients 102 can receive data from user input, a database, a file, a web service, and/or an application programming interface. The clients 102 can utilize programs such as the word processing application 112 for the creation, editing, and presentation of database report templates. The clients 102 can also utilize data mapper 108 to assign data queries to placeholders. The clients 102, however, can also provide many other programs that can be used with the techniques described herein (e.g., spreadsheet programs, presentation programs, e-mail programs).

In some embodiments, the client 102 can be designated as a "design time" client (e.g., client 102a) and/or as a run time client (e.g., client 102b), although this distinction is not required. In this embodiment, the run time client can omit the data mapper 108, as shown in FIG. 1. For example, the run time client can display and/or generate a completed report using previously mapped report templates and/or placeholders, thereby allowing the omission of the data mapper 108.

The network 104 can be a local area network (LAN), a wide area network (WAN), the Internet, cellular network, satellite network, or other networks that permit communication between the clients 102, the server 106, and other devices communicatively coupled to network 104. The network 104 can further include one, or any number, of the exemplary types of networks mentioned above operating as a stand-alone network or in cooperation with each other. The network 104 can utilize one or more protocols of one or more clients or servers to which they are communicatively coupled. The network 104 can translate to or from other protocols to one or more protocols of network devices. Although the network 104 is depicted as one network, it should be appreciated that in some embodiments, the network 104 can comprise a plurality of interconnected networks.

The server 106 can be, for example, an application server, a backup platform, an archival platform, a media server, an e-mail server, a document management platform, an enterprise search server, a combination of one or more of the foregoing, or another platform communicatively coupled to the network 104. The server 106 can also include mapping data 114 for the processing of placeholders and a report output generator 116 for generating a completed report. The server 106 can also utilize database 110 for storage and retrieval of data via database queries. The server 106 can be a host, such as an application server, which can process data traveling between the clients 102, and other devices communicatively coupled to the network 104. While the mapping data 114 and the report output generator 116 are shown in FIG. 1 as part of the server 106, this is not required. The mapping data 114 and/or report output generator 116 can be located elsewhere (e.g., in the client 102) if desired. The mapping data along with the report template can be considered the report definition.

The data mapper 108 can be an interactive component that maps and/or allows a user to map data queries to placeholders. For example, the data mapper 108 can communicate with word processing application 112 to receive a report template (or portions thereof). The data mapper 108 can search the report template for placeholders and then present the identified placeholders to a user. The user can then map/correlate those placeholders to corresponding queries having the proper syntax. Ultimately, the query generated from the data mapper 108 can be executed on the database 110 to retrieve the information desired by the creator of the report template. The data mapper 108 is described more fully below.

The word processing application 112 can be a typical word processing program such as MICROSOFT WORD, LIBRE OFFICE WRITER, WORDPAD, OPEN OFFICE WRITER and/or APPLE PAGES. Using the word processing application 112, a user can create a report template in the form of a document (e.g., a MICROSOFT WORD document). The document includes placeholders that are ultimately provided to the data mapper 108. The report template can be a formatted document set to appear as a completed database report with placeholders taking the place of completed database queries. The word processing application 112 can also generate and provide a finished report to the user (although at least some of this functionality is typically provided by other components such as the report output generator 116).

While the word processing application 112 is primarily described as a "word processing program," this is not required, and other types of applications can be used to generate report templates and finished reports. For example, the techniques described herein can also be used with other types of programs such as spreadsheets generated using MICROSOFT EXCEL, presentations created using MICROSOFT POWERPOINT, e-mails created using an e-mail client, web pages, text messages, instant messages, social media posts (e.g., FACEBOOK posts), etc.

The mapping data 114 can be information related to the database 110 that is generated as a result of a prior mapping operation. For example, after a placeholder is mapped to a proper query for extracting data from the database 110, this information can be stored as mapping data 114. The mapping data 114 can be generated by, for example, the data mapper 108. In some embodiments, the mapping data 114 can include a user-defined mapping along with a corresponding report template (or vice-versa). The mapping data 114 can be used at a later time to repeatedly create one or more completed reports without having to create a new mapping each time. Additional details about this process are described below. While the mapping data is shown in FIG. 1 as being part of the server 106, this is not required, and the mapping data 114 can be located elsewhere (e.g., on the client 102). Lastly, the mapping data can be stored one-by-one (e.g., a single placeholder mapped to a single query), as an entire report (e.g., all of the placeholders in a report template and the corresponding queries), and/or a combination of the same.

The report output generator 116 can be configured to generate a completed report from a report template. For example, the report output generator 116 can receive a report template, cause the execution of database queries using the mapping data 114 to retrieve information corresponding to the placeholders, and substitute the retrieved information into the report template to produce a completed report. In other words, the report output generator 116 can convert a report template into a completed report by retrieving the necessary information to substitute in place of the placeholders. The report output generator 116 can then provide the completed report to, for example, the word processor 112 for display and/or to a memory for storage.

The report output generator 116 can be run contemporaneously with the data mapper 108 or can be run at a later time using previously-established mapping data. This can be enabled by an architecture that is divided up into design time and run time phases. For example, i) a report template can be created, placeholders can be mapped, and completed report can be generated all in one session, and/or ii) a report template can be created, placeholders can be mapped, and a completed report can be generated in different sessions. While the report output generator 116 is shown in FIG. 1 as a separate block, it can also be included as part of another component (e.g., it can be part of the word processing application 112).

Figure 2:
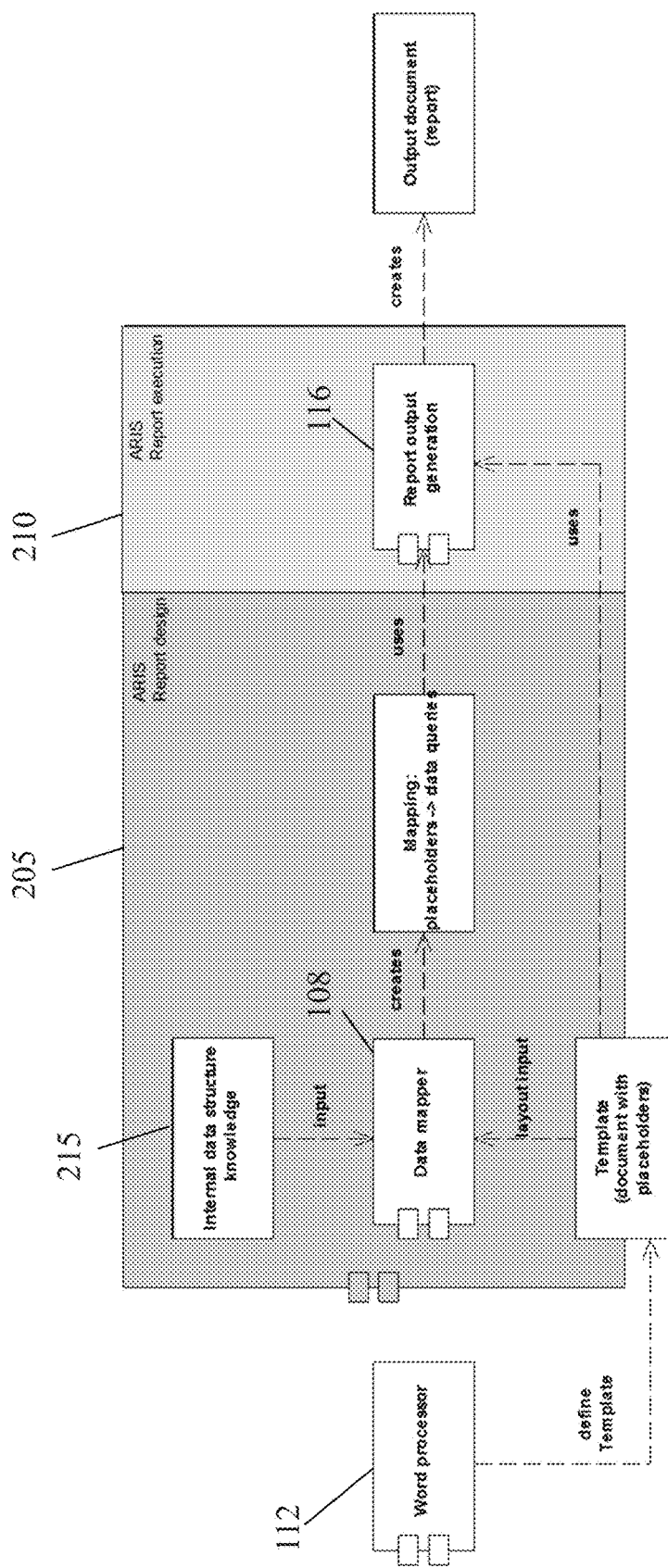
FIG. 2 is a flow diagram of an exemplary mode of operation of a system described herein.

Referring also to FIG. 2, an exemplary mode of operation of the data mapper 108 using the ARIS platform provided by SOFTWARE AG of Darmstadt, Germany is shown. In this embodiment the process can be thought of as involving two phases: a design-time phase 205 and a run-time phase 210 (although, the use of different phases is not required).

Figure 3:
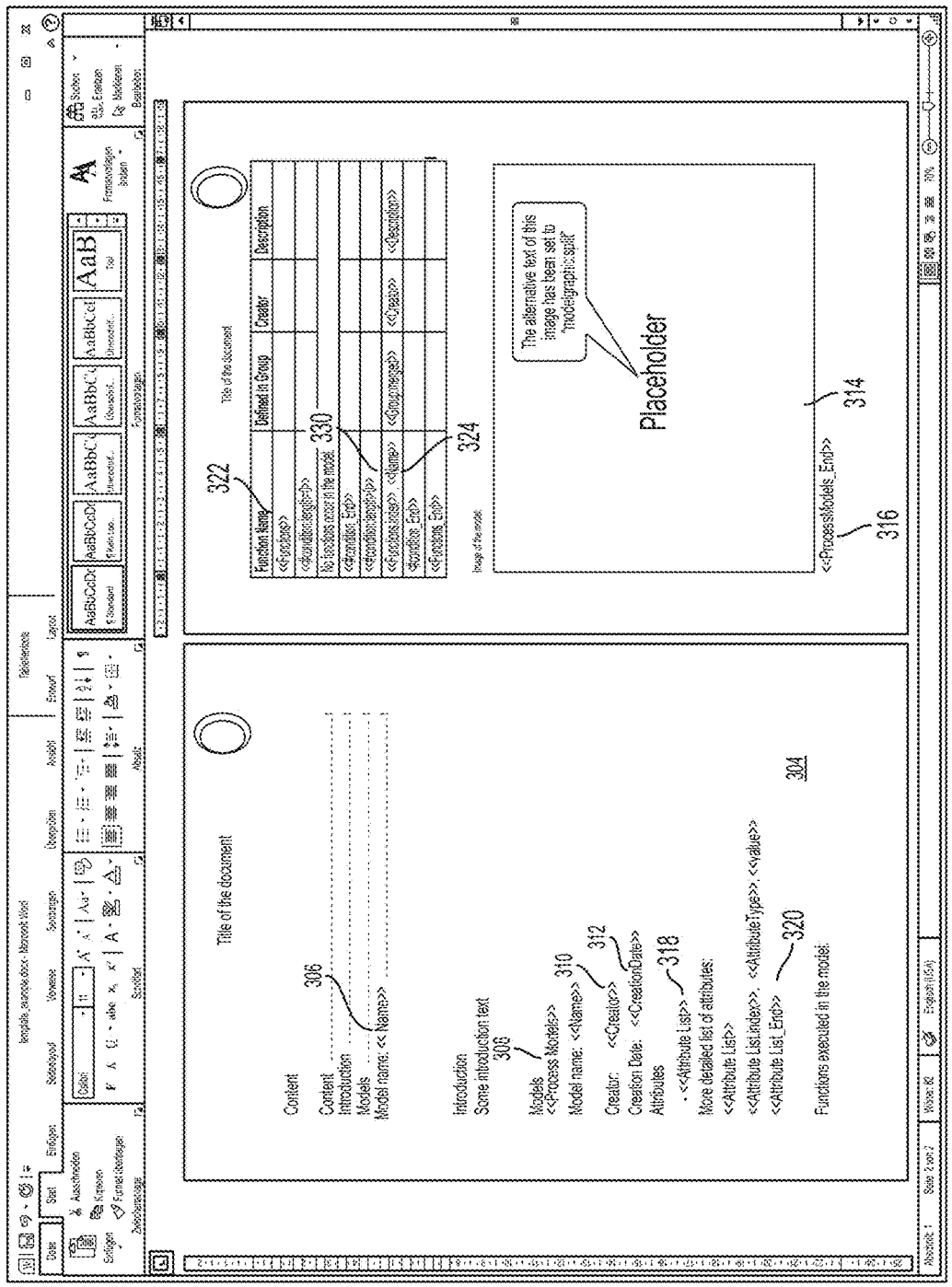
FIG. 3 is an exemplary report template created using a word processing program.

During the design time phase 205, the data mapper 108 can receive a report template from the word processing application 112 that includes placeholders (an exemplary report template is shown in FIG. 3). The report template can be imported into the data mapper 108, which can analyze the report template to identify all of the placeholders therein and an associated hierarchy of the placeholders.

Each of the extracted placeholders can be displayed to the user (or another role) in one or more formats. For example, in some embodiments, the data mapper 108 displays the extracted placeholders in a tree format that represents the hierarchy associated with the placeholders (an example of this is described below with respect to FIGS. 5-6). Using the display, the user (or another role) can interactively assign/map data queries to each of the placeholders in the report template (e.g., a formal query definition to be executed can be mapped to each placeholder). In the example of FIG. 2, the queries can be generated Script-API calls and/or ARIS queries, although other queries are possible. Further details of the mapping process are described below with respect to, for example, FIGS. 5-6.

As part of the process of assigning/mapping data queries to the placeholders, the data mapper 108 can use internal data structure knowledge 215 to display possible query selections. For example, the internal data structure knowledge 215 can include application-specific knowledge such as how data elements are connected (e.g., structure) and which query possibilities are available (e.g., in this ARIS-specific example, which ARIS metamodels and query options are available). Each of the mappings can be stored as mapping data 114 (e.g., on the server 106).

During the run-time phase 210, which occurs after the design-time phase 205, the report output generator 116 reads a report template to identify the placeholders therein. The report output generator 116 then retrieves the corresponding mapping data (e.g., from mapping data 114) for the placeholders in the report template. Using the mapping data, the report output generator 116 causes the corresponding queries to be executed in the database 110. The placeholders in the report template can then be replaced with the information retrieved using the queries to generate a completed report. The report output generator 116 can then store the completed report for later use (e.g., in a memory in the client 102 and/or the server 106). In general, the completed report can be a document with the same content and formatting of report template where the placeholders have been replaced by the resulting output of the database queries the placeholders are intended to represent. The format of the output report can advantageously be arbitrarily defined by the user prior to execution of any database queries.

Referring to FIG. 3, an exemplary report template created using MICROSOFT WORD is shown. In this example, document 304 is an embodiment the report template described above. The document 304 can be arbitrarily formatted by the user and can include a number of placeholders (e.g., placeholders 306, 308, 310, 312, 314, 316, 318, 320, 322, 324, and 330). Examples of the placeholders shown in FIG. 3 include <<Name>>, <<ProcessModels>>, <<Creator>>, <<CreationDate>>, etc. Preferably, the placeholders are placed near descriptive titles of the referenced data (e.g., <<CreationDate>> is next to "Creation Date:").

Placeholders within the document 304 can be almost any words or phrases set off by the "<<" and ">>" characters. In one sense, placeholders can be thought of as a character sequence that is later replaced with data. For example, a user can create a placeholder that represents a date of creation of a particular element of the database 110. The user could name the placeholder descriptively with the string "CreationDate." The string could then be defined as a placeholder by placing it inside the special characters "<<" and ">>." In this example, the placeholder could be inserted into the document as <<CreationDate>>. Although this example refers to the "<<" and ">>" characters, characters other than "<<" and ">>" or merge fields can be used to set-off placeholders. Because placeholders are typically mapped to database queries by the data mapper 108 in later process, placeholders can have arbitrary names that are independent of any structure used by the database 110.

In another aspect, placeholders can refer to database query results which are lists of items or they can refer to simple data output.

A region can be a part of the document template that is enclosed in matching start and end placeholders (e.g., <<x>> and <<x_End>>). For example, the space between placeholder 308 (i.e., <<ProcessModels>>) and placeholder 316 (i.e., <<ProcessModels_End>>) can be considered a region in the document 304. Regions can also be nested within one another. For example, the region between placeholders 318 and 320 is nested within, and can be considered a child of the region defined between placeholders 308 and 316. In one sense, a region can refer to a query that returns a list of elements.

By contrast, the placeholder 312<<CreationDate>> refers to simple data output. Simple data output placeholders can be identified by the lack of a corresponding <<_End>> placeholder. Simple data output placeholders can return either i) simple data that replaces the placeholder and uses its formatting in the completed report, or ii) list data that is to be filled into the completed report in linewise fashion using the existing line formatting of the document 304. Placeholders that relate to simple data output can be represented by an arbitrary word that is descriptive of the data output it relates to. For example, the placeholder "Time" which refers to simple data output can be represented in the report template as <<Time>>, although this is not required.

The placeholders in the document 304 can be arranged in a hierarchical configuration where one placeholder is a parent or child of another. The hierarchy can include multiple levels. For example, in FIG. 3, ProcessModels (i.e., placeholder 308) is a higher level than Functions (i.e., placeholder 322), which is a higher level than Name (i.e., placeholder 324). Stated differently, the Name placeholder is a child of the Functions placeholder, which is a child of the ProcessModels placeholder. Likewise, the ProcessModels placeholder is a parent of the Functions placeholder, which is a parent of the Name placeholder. Placeholders can have multiple children and/or parents. All placeholders (except the highest level placeholder) are typically children of at least one other placeholder. The highest placeholder can be related to the topmost query, and can be known as the "toplevel placeholder," which is typically mapped to the "toplevel query." The parent/child relationship between two placeholders can affect the mapping process, as described more below.

Figure 4A:
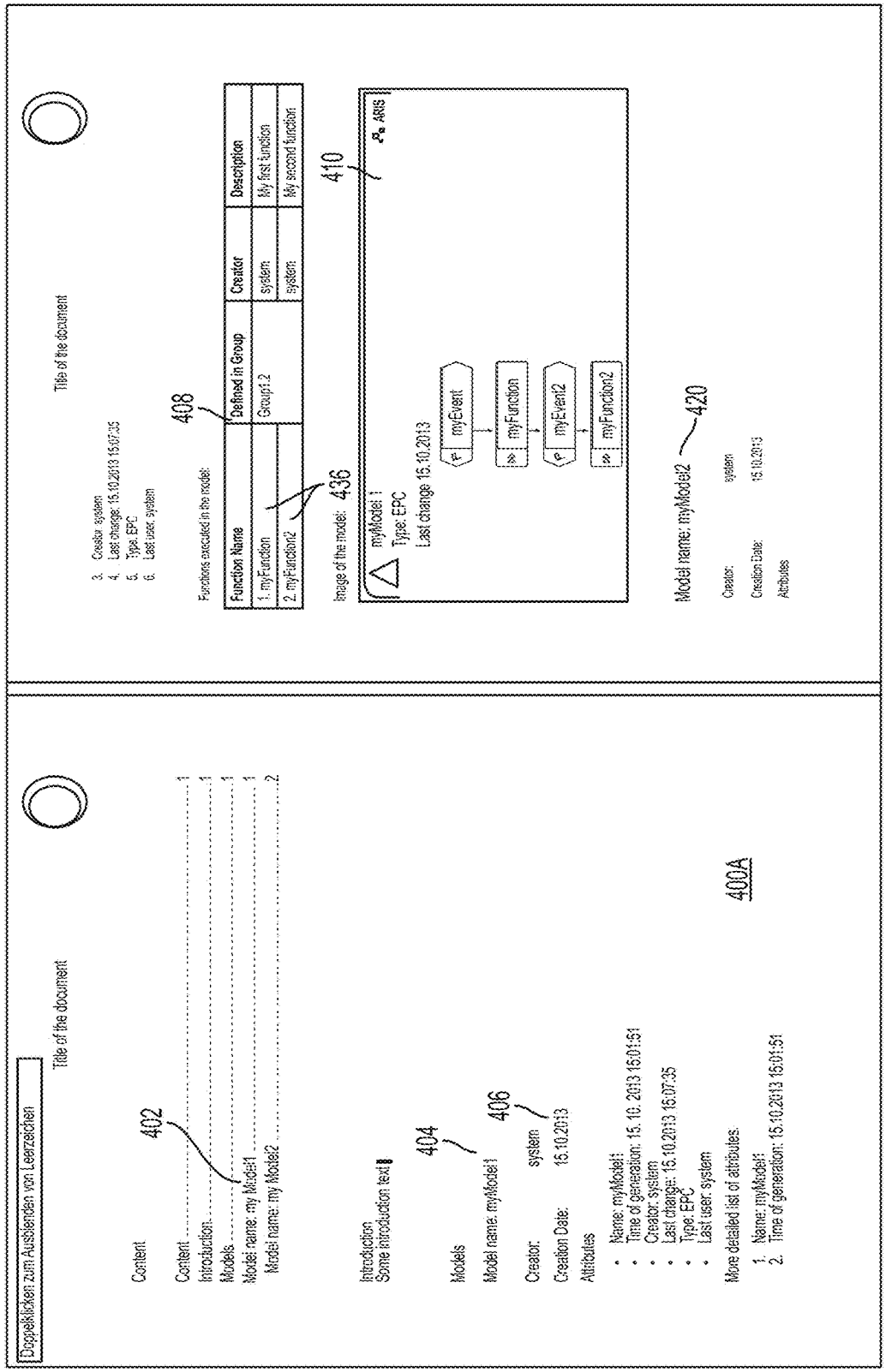
FIGS. 4A and 4B collectively show an exemplary embodiment of a completed report.
Figure 4B:
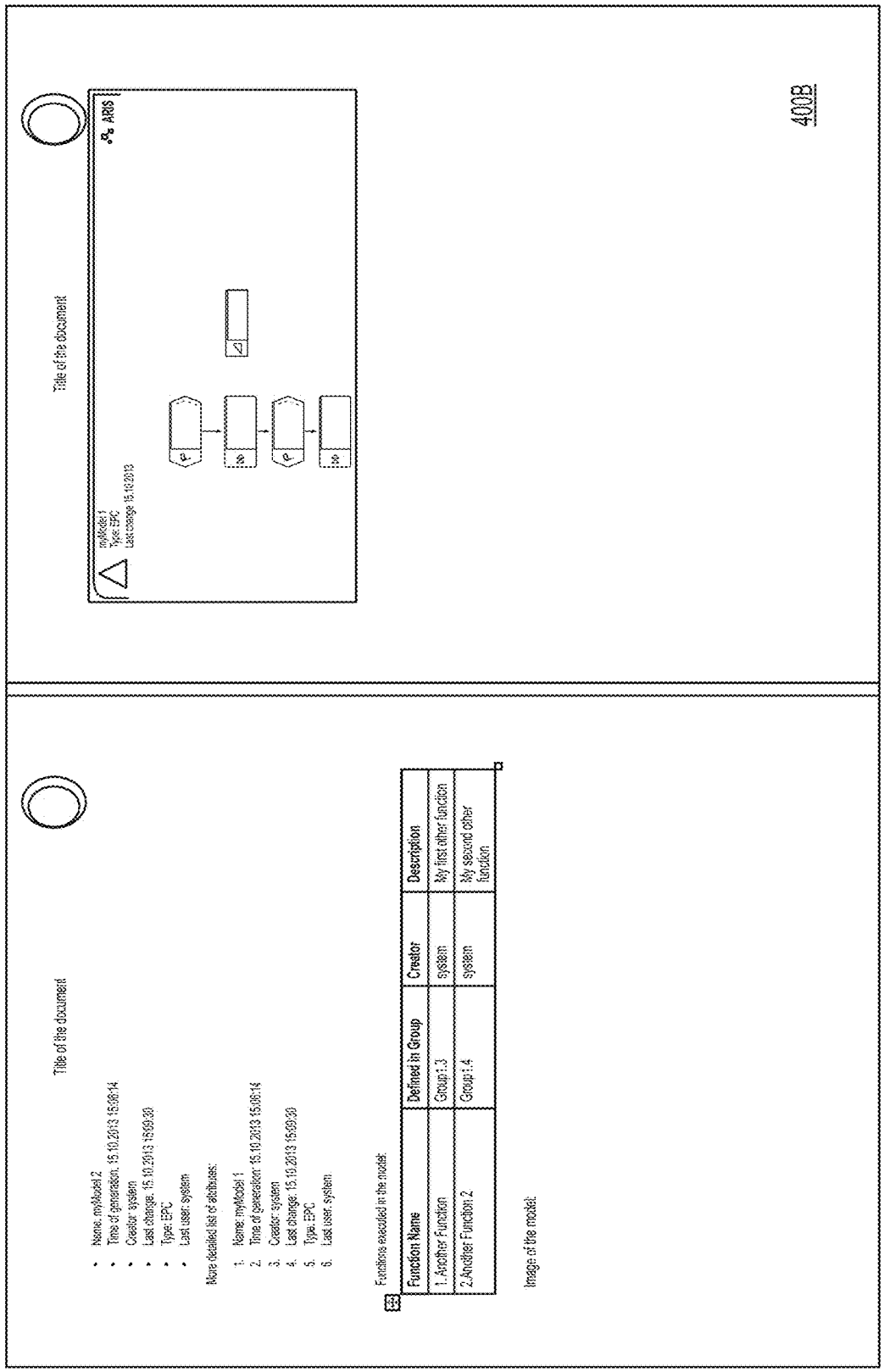

Referring to FIGS. 4A and 4B, an exemplary completed report generated from the document 304 is shown (FIGS. 4A and 4B represent a four-page report with part 400A shown in FIG. 4A, and part 400B shown in FIG. 4B). The completed report represents exemplary results of the process of i) creating the document 304, ii) mapping placeholders to queries using the data mapper 108, and iii) executing the corresponding queries to create the completed report. The query results (e.g., 402, 404, 406, 408, and 410) can replace placeholders originally in document 304. Results 402 and 404 represent the name of a queried model (e.g., myModel1). Result 406 represents the date of creation of myModel1 (e.g., Oct. 15, 2013). Result 408 represents the functions executed in the parent model myModel1 (e.g., myFunction1 and myFunction2). Result 410 represents a graphical image of the model. FIGS. 4A-4B thus collectively provide the output report for a single report template where the placeholder "ProcessModels" referred to two models (e.g., myModel1 and myModel2).

Referring to FIGS. 5 and 6 an exemplary interface 500 for mapping and/or defining queries corresponding to the placeholders in the document 304 is shown. FIGS. 5 and 6 show the interface at two different times as the mapping process advances (FIG. 6 is later in time than FIG. 5). In some embodiments, while the user who created the original report template need not have any knowledge of how the database 110 is structured, such knowledge can be beneficial to the user (or other role) that creates the mapping. For example, the user/role responsible for completing the mapping can know how data is structured in the database (e.g., how metamodel information is structured in ARIS).

In the left pane 502 of the interface 500, typically each placeholder in the document 304 will have a corresponding row. All placeholders extracted from document 304 are typically presented in a hierarchical tree format that is extracted from the document 304. For example, a user can easily tell that "Name" is a child of "Functions" in FIGS. 5 and 6 from the structure of the tree (e.g., because "Name" is under "Functions" and slightly indented). The hierarchical structure can be used to restrict the possible queries selectable for individual placeholders as described more fully below. As a user works on a particular placeholder, the corresponding row in the interface 500 can be highlighted (e.g., highlight 510).

The hierarchical tree in the left pane 502 of FIG. 5 can be created by extracting placeholders iteratively from document 304. In one embodiment, the system can detect regions in the template corresponding to placeholders. For example, upon finding a first placeholder, the system checks whether there is another placeholder somewhere in the template with the same name ending with the "_End" phrase. If that placeholder is found, the process can be repeated for all placeholders between the two located "Start" and "End" placeholders (e.g., representing a lower level of nesting in the tree). If the "_End" placeholder is not found, the placeholder can be added to the current level of the tree. After the above stage is completed, the system can then continue searching in the same manner until the end of the document is reached.

In the center pane 504 the user (or another role) can define a query for each line of the hierarchical tree (e.g., for each placeholder). As shown in FIGS. 5-6, this can be done via "SELECT" clauses, but this is not required, and other clauses can be used. For example, the user can define a query corresponding to ProcessModels in field 520.

Figure 7A:
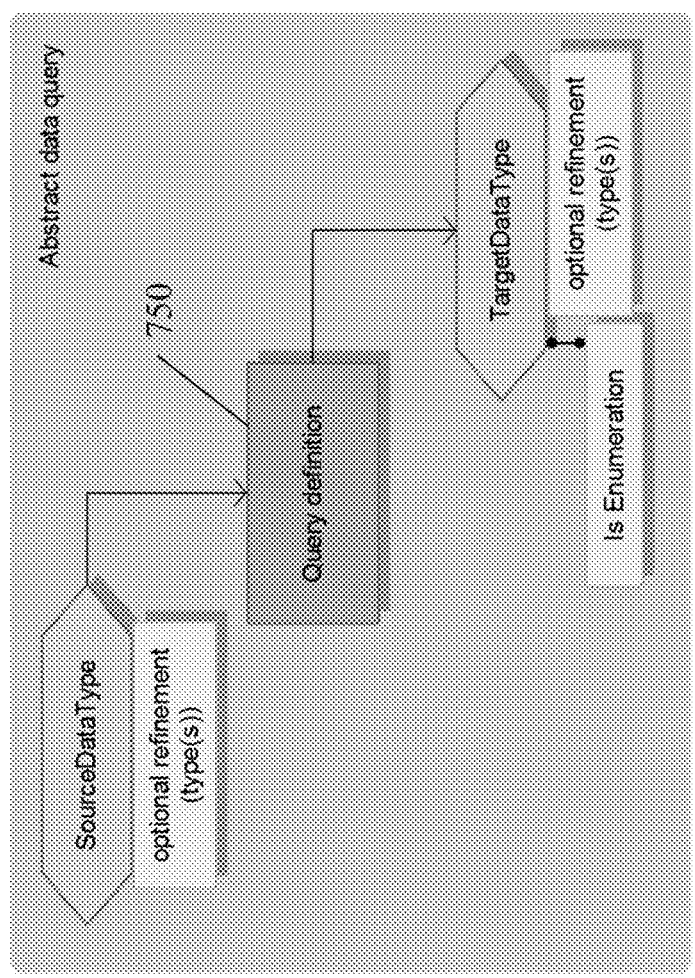
FIGS. 7A-7C show exemplary query structures.
Figure 7B:
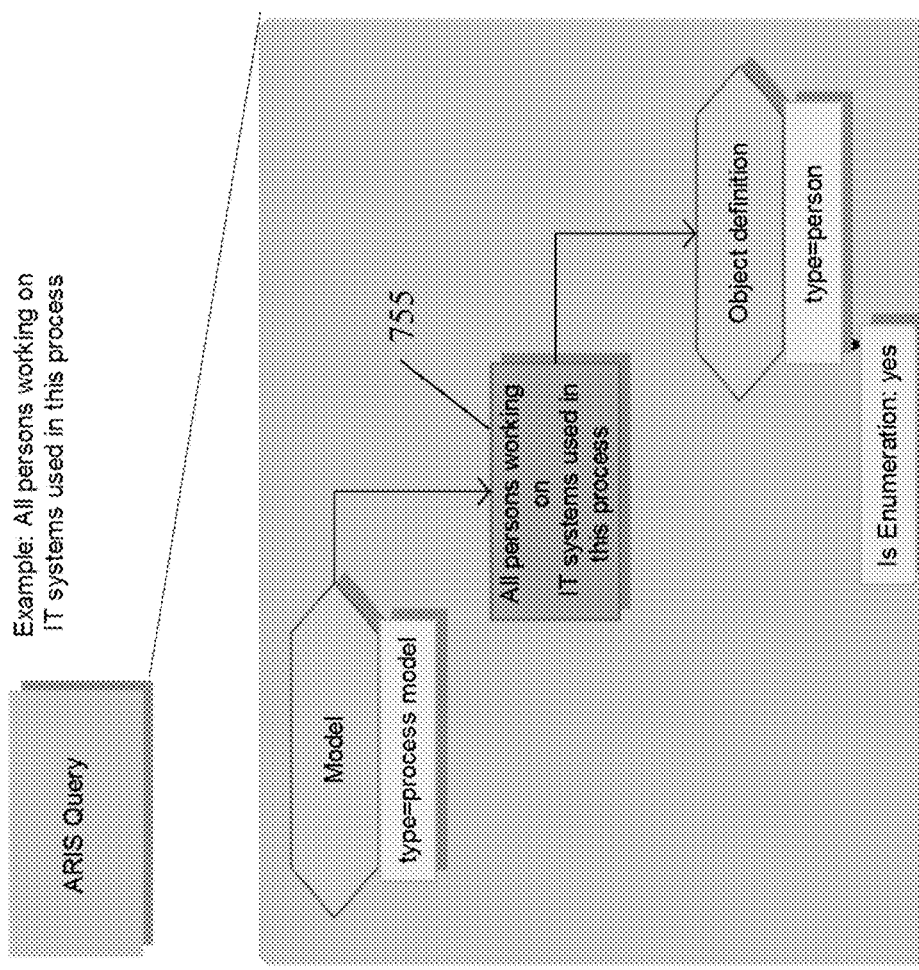
Figure 7C:
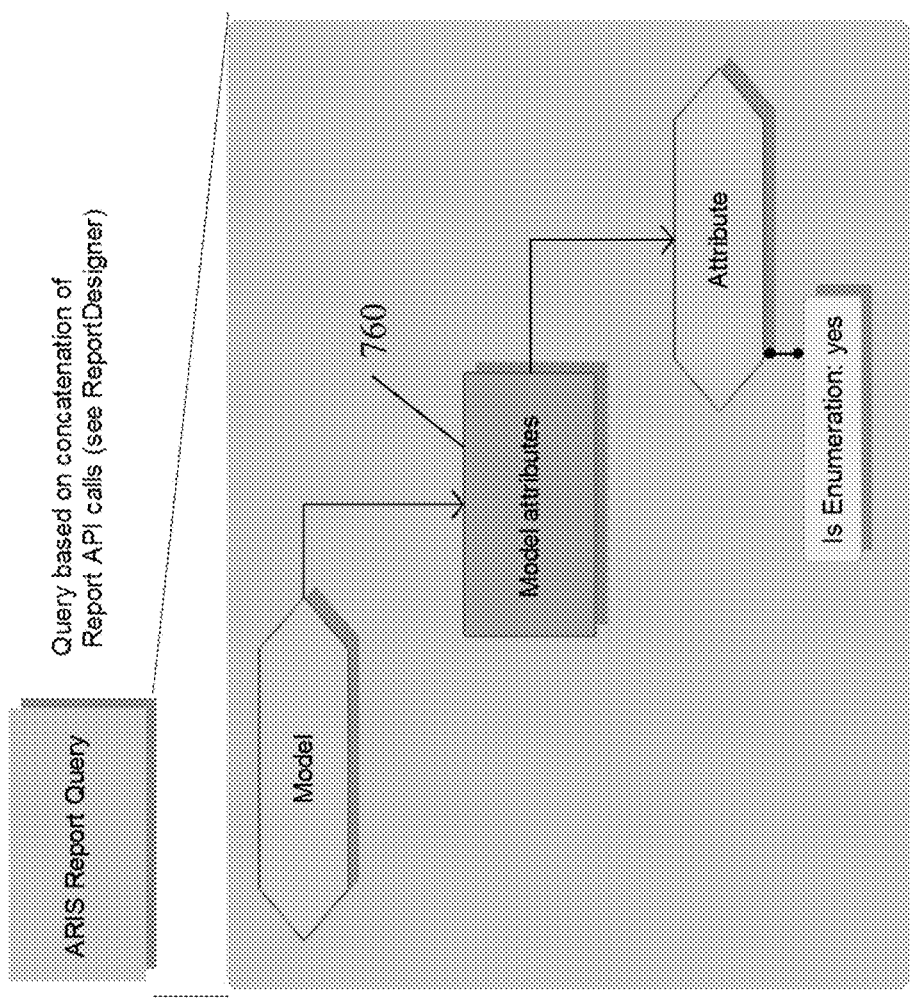

The choice of queries available in the center pane 504 can depend on the placeholder itself and/or the placeholder's parents, grandparents, great-grandparents, etc. (if any). For example, the available queries for each placeholder will typically respect the constraint of a result data type of the parent. FIGS. 7A-7C can be useful in describing this concept further. FIGS. 7A-7C are transition diagrams that represent a query of a type: i) general (FIG. 7A), ii) Model to Object list (FIG. 7B), and iii) Model to Attribute list (FIG. 7C).

Referring to the general embodiment in FIG. 7A, a generic query definition 750 is shown. Using this generic case, each query typically has a SourceDataType and a corresponding TargetDataType. The SourceDataType of each child query will typically match, be inherited, and/or be constrained by the TargetDataType of its parent. FIG. 7B shows a specific example of the generic case: an ARIS query. In FIG. 7B, the query definition 755 is "All persons working on IT systems used in this process." The query 755 has a SourceDataType of "Model" that is inherited from its parent (and/or defined by the report template itself) and a TargetDataType of "Object definition," with a further type of "person." FIG. 7C shows yet another specific example of the generic case: an ARIS report query with a query based on concatenation of Report API calls. In FIG. 7C, the query definition 760 is "Model Attributes." The query definition 760 has a SourceDataType of "Model" that is inherited from its parent (and/or defined by the report template itself) and a TargetDataType of "Attribute."

In other words, queries can have a data type that they start with (e.g., an input) and can return a result of a certain data type (e.g., an output). If a query returns a list of a certain type "A," the mapping of its children (if any) can have "A" as a defined input, and can be executed for each element of the list generated from the parent query.

Turning back to how placeholders are mapped to queries in the interface 500, if a user (or another role) wants to assign a data query to the placeholder "ProcessModels," the user can define and/or describe the corresponding query in the center pane 504. The corresponding query defines how to obtain the desired data from the database 110. In this example, since "ProcessModels" is at the topmost level of hierarchal tree, this placeholder can be referred to as a top level placeholder and the resulting query can be referred to as a top level query. Because the top level placeholder has no parent, the SourceDataType of the corresponding query can be defined by and/or inherited from the document 304 itself (e.g., this information can be embedded in metadata of the document 304). For example, when a user creates the document 304, the user can associate one or more types with it, such as "model." Accordingly, when the user maps a corresponding query for "ProcessModels," all available queries for the type "model" can be available to the user in the field 520. In other words, "model" can be inherited from the document 304 as the SourceDataType of the corresponding "ProcessModels" query because "ProcessModels" is the top level placeholder.

Continuing this example, the query corresponding to ProcessModels can be defined as: all models in the database 110 which describe processes. Models can be thought of as describing processes when they have a type that indicates that they describe processes. This results in the following top level query:

SELECT Model FROM Database WHERE Type IN {A,B,C}

The result of this query is elements of the item type "Model," but only those Models which have the subtype "A," "B," or "C". These subtypes can be selected by the person performing the mapping in FIG. 5, and can be selected using the internal data structure knowledge 215.

Continuing the example, when defining the query to be assigned to "Functions," the user can select from all queries that have a process model as an input. In this example, the user selects a query that extracts objects typed as "Function" from the input data:

SELECT Object FROM Model WHERE Type="Function."

Since models typically contain more than one function, the result type of this query is a list of objects of type function. Furthermore, because this query is a child of the top level query described above, the result type of this query is further constrained to be a list of objects of type function associated with any of the models A, B, or C.

Since the placeholder "ProcessModels" in this example corresponds to a "region," the inner layout of this region can be repeated for each element of the result (e.g., a list of "models") in a completed report. Thus, the inner queries can refer to each single element of the resulting list. For example, the database 110 can contain one model of subtype A, one model of subtype B, and no models of subtype C. The result of this top level query would then return two different models. The completed report would then repeat the entire layout of the report template for all content between the "ProcessModels" and "ProcessModels_End" placeholders for each of these two models. An example of this is illustrated in FIGS. 4A and 4B. The query resulting from the "ProcessModels" placeholder resulted in myModel1 and myModel2, thus, the entire the completed report includes the layout corresponding to "ProcessModels" twice (e.g., beginning at result 404, and then again at result 420).

The right pane 506 shows a sample read-only preview of the document 304. As a user selects a particular placeholder in the interface 500 (i.e., ProcessModels in FIG. 4), the corresponding portions of the document 504 can be highlighted (e.g., highlighting 516).

In some embodiments, the user maps queries to placeholders in a top-down manner (e.g., from a the top level placeholder to the lowest-level child) since the result of a parent query is typically needed as input data for a child query, although this is not required.

Referring to FIG. 6, this figure is a continuation of FIG. 5, except that the user is now working on the mapping of AttributeList. For example, by comparing FIGS. 5 and 6, it can be seen that AttributeList is now highlighted with the highlight 610 (rather than ProcessModels) and the corresponding portion of the right pane 506 is highlighted with corresponding highlight 618. Referring to center pane 504, a query corresponding to AttributeList is shown:

SELECT ALL Attribute FROM Model

Figure 8:
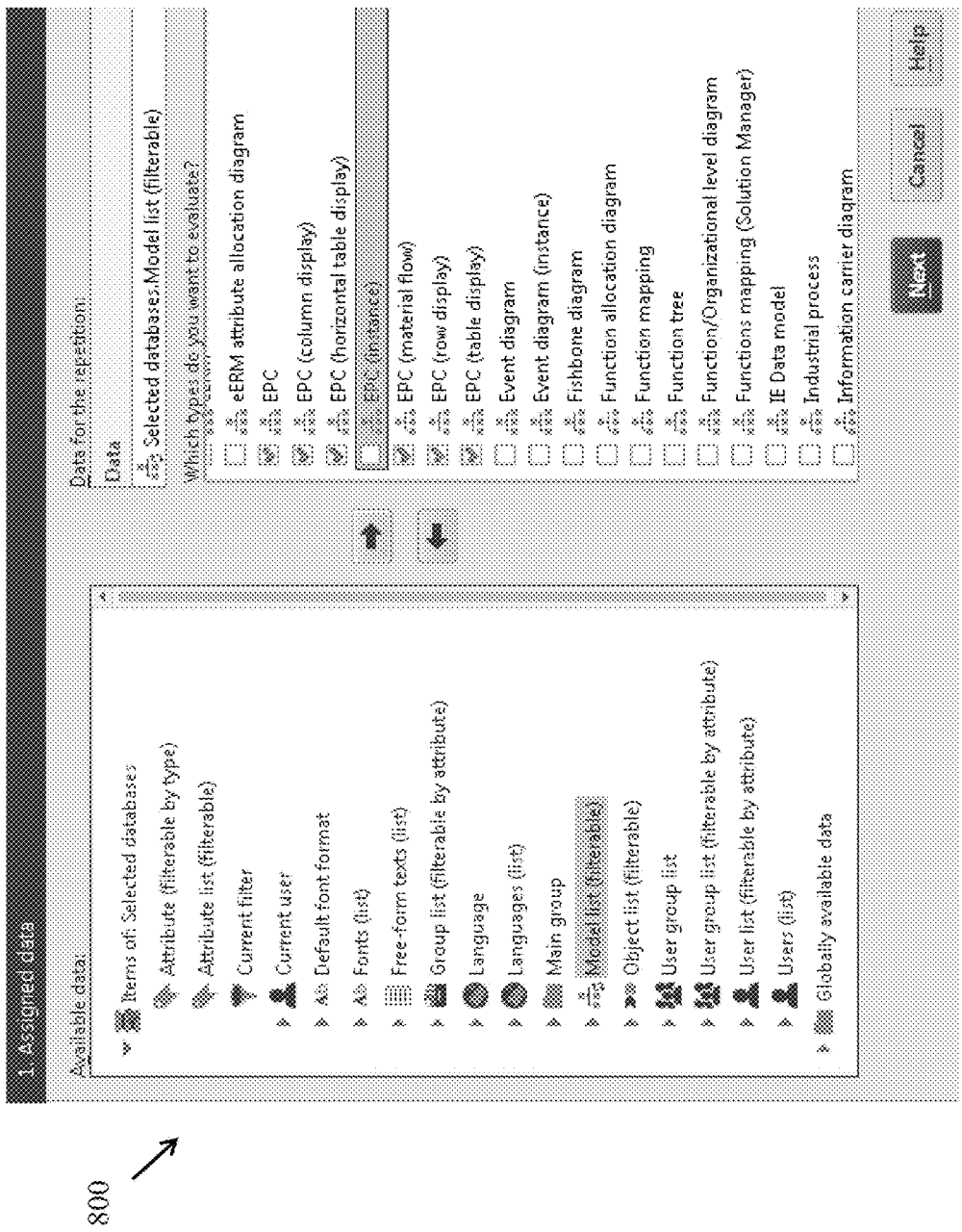
FIG. 8 shows an exemplary interface that can be used with the data mapper of FIGS. 5-6.

This query (and the other queries described herein) can be defined by the user using the interface presented in FIG. 8.

If a user presses any of the " . . . " buttons 524 shown in FIGS. 5-6, the user can define/select the corresponding query interactively via a dialog window. For example, referring to FIG. 8, an exemplary dialog window 800 generated using ARIS is shown.

Figure 9:
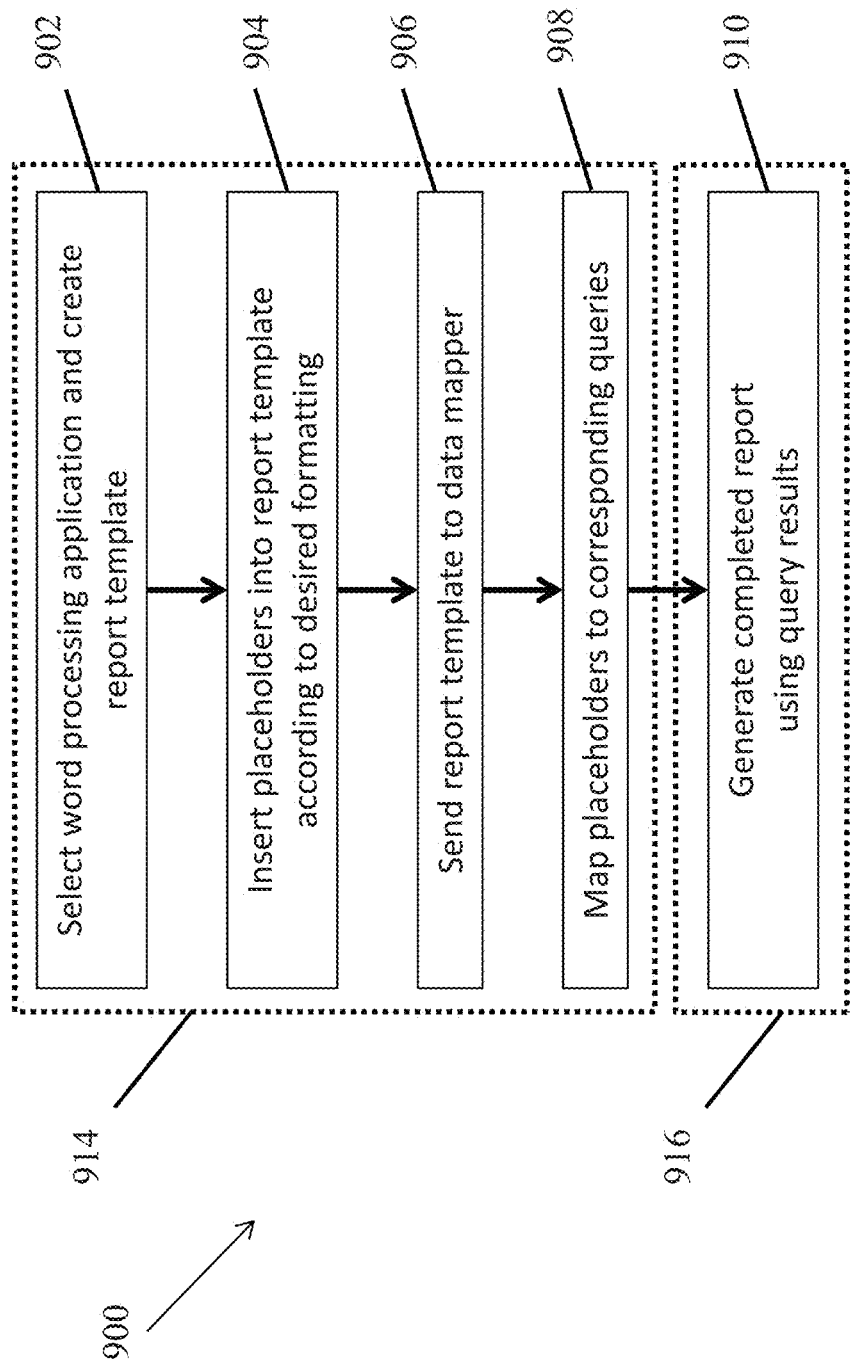
FIG. 9 is an exemplary process flow diagram illustrating an embodiment of the techniques described herein.

In operation, referring to FIG. 9, with further reference to FIGS. 1-8, an exemplary process 300 for creating a report template, mapping placeholders to associated queries, and generating a completed report includes the stages shown. The process 900 may be altered, e.g., by having stages added, removed, altered, or rearranged.

At stage 902, the user can select the word processing application 112 and create a report template. The word processing application can include any application that the user is comfortable with. After starting the word processing application 112, the user can open an existing document or create a new document. For example, referring to FIG. 3, a screen shot of an exemplary embodiment of the disclosed subject matter shows a document 304 (which is an embodiment of the report template) being created in MICROSOFT WORD.

At stage 904, the user can insert placeholders into the document in the desired format. For example, referring still to FIG. 3, the user can insert placeholders (e.g., placeholders 306, 308, 310, and 312) into the document 304 being arranged and configured as desired (e.g., location, orientation, font, size, etc.). A placeholder can be an arbitrary string of text created by the user as a temporary designation to refer to a desired query to the database. The placeholder can be used to allow a user to design the format of an output report query from a database. The placeholder can eventually be mapped to a corresponding query in the data mapper 108. The placeholders can generally be named with an arbitrary designation that the designer can understand refers to the intended query to the database.

The placeholders in the document 304 are preferably formatted to appear in the desired location in the completed report. For example, the placeholder <<CreationDate>> can be placed directly below the heading "CREATED ON:" to generate a report that places query responses in an easy to read, customizable format. In another example, the user can create the placeholder <<Name>> next to the text "MODEL NAME:" to generate a report that places the name of the model being used in an easy to read, customizable format. The user can create an arbitrary number of placeholders to refer to queries to the database 110, and each placeholder can be formatted to create a report template that is later converted into the completed report during the run-time phase. Thus, the placeholders can advantageously be chosen without knowing the structure of the underlying database.

At stage 906, the data mapper 108 receives the document 304 (e.g., at a receiving module). In one embodiment, the data mapper 108 can be included as a part of an ARIS client application, although this is not required and the data mapper 108 can be a standalone application or program. The data mapper 108 scans the document 304 for placeholders and presents the user with a data mapping interface 500. The scanning of the document 304 can be performed by a reading module that can be part of the data mapper 108.

At stage 908, the user can map each placeholder in the document 304 to a corresponding query using the interface 500 (e.g., using a first mapping module). If desired, this stage can be performed by another role, such as an administrator with knowledge of the database. The user can be provided with a hierarchal tree of the used placeholders in the interface 500. The tree can then be used to map each placeholder to a corresponding query. In some embodiments, the queries can be either generated Script-API calls and/or ARIS Queries. For example, a mapped query for the document placeholder <<AttributeList>> can be [SELECT ALL Attribute FROM Model]. The queries can be executed against the database 110 to retrieve data. The queries can be executed by, for example, a search module that can query the database 110.

At stage 910, a completed report is generated using the document 304 and the information retrieved from the database 110. In one embodiment, the completed reported is generated by report output generator 116. The results of the queries can replace the placeholders in the document 304 to create the completed report. For example, in an embodiment that uses ARIS, this stage can be accomplished by providing tools inside ARIS to link ARIS data to document placeholders. The completed report can be free of placeholders, as they are replaced with the results of executed queries to the database 110. This stage can be performed by, for example, a second mapping module and an updating module.

Stages 902, 904, 906, and 908 can generally be grouped into a "design time" process (e.g., 914 in FIG. 9), and stage 910 can be part of a "run time" process (e.g., 916 in FIG. 9), although this is not required. For example, a template can be initialized (e.g., defined and mapped) during design time 914. Then, at a later time, the report template, along with previously generated mapping data, can be used repeatedly to create one or many reports without having to remap the placeholders. Thus, in some embodiments a user does not need to create a mapping each time the user wants to generate a completed report, as long as the placeholders in the report template have not been changed. This can ease the process of ensuring that a completed report is synchronized with the latest data in the database 110.

FIG. 10 provides exemplary details of acceptable placeholder syntax for use with system 100. The user can use nearly any placeholder name he or she wants, because the semantics of the database query are preferably added only when the placeholder is mapped to a query. FIG. 10 demonstrates that typically a small set of predefined names are excluded as allowed placeholders. For example, in one implementation, the keywords <<, >>, #, :, and _End are typically not allowed to be part of the placeholder name, because they can interfere with the ability of the data mapper to scan the document for placeholders.

The placeholder <<Model>> can stand for text representing a "Model" (for example the model name) or for the beginning of a region. It can be interpreted as the beginning of a region when there is a corresponding end placeholder (e.g., <<Model_end>>) in the report template. If regions are nested, it can be assumed the user has given the different regions distinguishable names.

One can also access the length and index of the results of queried data if the result is a list using the following syntax:
<<[placeholder.]index>>, <<[placeholder.]length>>.
For example, in FIGS. 4A-4B, the placeholder <<ProcessModels>> returns two models: myModel1 and myModel2. Therefore, <<ProcessModels.length>> would return "2" because there are two results, and <<ProcessModels.index>> would return the index of the currently written result item (either 1 or 2 in this example).

Index and length can also be used to create conditional statements within the report template. These conditional statements can allow the user to define report behavior in the template without knowing certain characteristics of the underlying database. For example, the following conditional block can be added to the report template:

```
<<Model>>
...
<<#condition:[Model.]length=0>>
No models!
<<#condition_end>>
<<#condition:[Model.]length>0>>
Model name: <<name>>
Model number: <<:[Model.]index>>
<<#condition_end>>
...
<<Model_end>>
```

The preceding text can be placed into the report template. When the report output generator 116 replaces the placeholders with the appropriate data, it can check whether the condition Model.length=0 is true (e.g., if there are no results from the query). If it is, then the text "No models!" can appear. If it is not true, then the text "Model name: Model" can appear, where "Model" will be the name of the model. Additionally, the text "Model number: #" can appear, where "#" will be the index of the model in use. Using the example of FIGS. 4A and 4B, the (unformatted) output of this statement would be:
Model name: myModel1
Model number: 1
Model name: myModel2
Model number: 2

A further example this can be seen by comparing the document 304 and the completed report. The document 304 includes a cell 330 that includes the following placeholders:
<<Functions.index>>. <<Name>>
In the completed report it can be see that there are two results, myFunction and myFunction2 (e.g., cells 436). The index "1" is placed before myFunction and the index "2" is placed before myFunction2.

Finally, the placeholder <<..:merged>> can be used to cause cells inside of a table to be horizontally and/or vertically merged within the report template. For example, this placeholder can be used to merge adjacent rows of cells with the same content, such that the table in FIG. 12 can be formatted as shown in FIG. 13.

In some embodiments, low-level field formatting such as "date" or "number" can be ignored by the system because query results can be assumed to know how to transform themselves into the appropriate text. This text can be formatted exactly as the field is formatted in the template (e.g., bold, italic, or font size).

In some embodiments, images can use a special handling, as image formatting can be performed in a template on an image itself. For example, a user can insert a dummy image placeholder 314 into the document 304 and maintain the property "alternative text" as placeholder name. The user can format the image as desired (e.g., size, border, or text flow). In the completed report, the image placeholder can be replaced with an actual image (e.g., image 410).

A potential problem when one uses word processing templates which are to be filled with data is ensuring that template and data are "in sync." This problem can occur when the report template is updated. For example, the synchronization issue can arise if the user revises the placeholders in the report template. The data mapper 108 can offer easy synchronization between the current version of the template and the mapped data. For example, report templates can be checked to make sure that corresponding mapping data is still up to date (assuming the report template has been previously mapped). In circumstances where placeholders have been added, the user can be presented with the data mapper 108 to map the newly added placeholders. In circumstances where placeholders have been removed or are no longer used, these placeholders can be ignored during runtime when the completed report is generated.

In some embodiments, the data mapper 108 can be part of an ARIS client application produced by SoftwareAG of Darmstadt, Germany. In this example, when the user wants to define a new report, the user can select a template from his or her file system, which is then imported into ARTS. The next view presented to the user can be similar to that shown in FIG. 11. A possible advantage of including the data mapper 108 in ARIS is, for example, that functionalities already exist to define ARIS-specific queries (e.g., as shown in FIG. 8).

Figure 11:
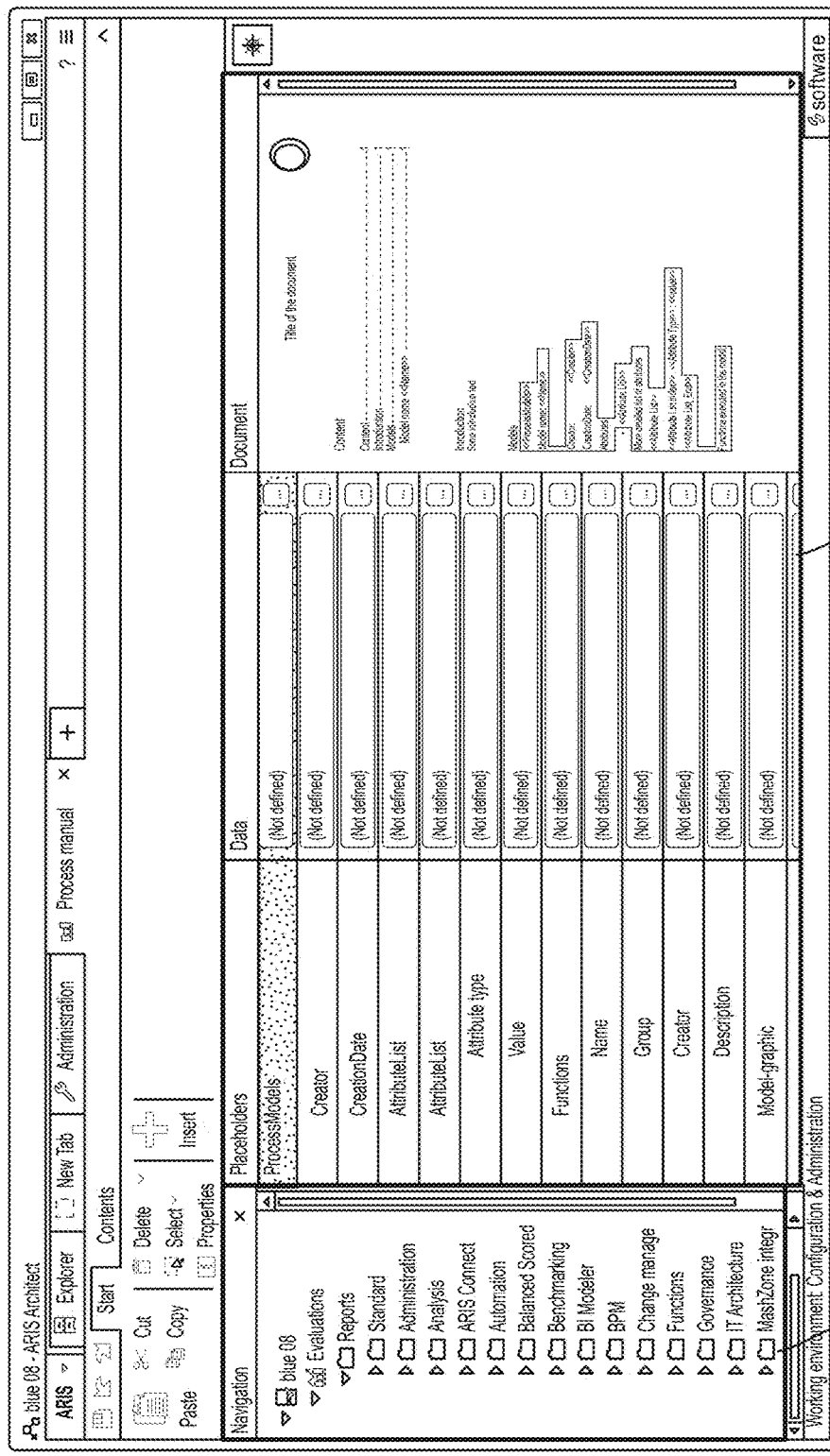
FIG. 11 shows an exemplary data mapper interface.

FIG. 11 provides an exemplary implementation of the data mapper 108 in the ARIS application. ARIS interface window 1100 can include navigation pane 1102 and data mapping interface 1104. As in FIGS. 5-6, interface 1104 comprises three panes: a left pane representing the tree structure, a center pane representing the mapped database queries, and a right pane representing a preview of the report template.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

The description herein describes network elements, computers, and/or components of a system and method for providing a bundled product and/or service along with an insurance policy that can include one or more modules. As used herein, the term "module" refers to computing software, firmware, hardware, and/or various combinations thereof. At a minimum, however, Modules, are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another.

Additionally, the modules can be moved from one device and added to another device, and/or can be included in both devices. To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The invention claimed is:

1. A computerized method, implemented in at least one processor, for automatically generating a report, the method comprising:
   receiving, by the at least one processor, a document that includes placeholders arranged in a layout;
   reading, by the at least one processor, the placeholders in the document;
   retrieving, by the at least one processor, executable queries corresponding to the read placeholders in the document based on mapping data stored outside of the document, the mapping data including a predefined correspondence between the placeholders and the respective executable queries;
   executing, by the at least one processor, a search of a database using the retrieved executable queries to retrieve information from the database;
   mapping, by the at least one processor, the information from the database to the layout; and
   generating an updated document that includes the information retrieved from the database arranged in a layout defined by the layout of the placeholders.

2. The method of claim 1, wherein reading the placeholders includes determining regions in the document corresponding to the read placeholders.

3. The method of claim 1, wherein the executable queries have a defined input type and a defined output type.

4. The method of claim 1, wherein one of the placeholders is identified as a top level placeholder.

5. The method of claim 4, wherein an input type of a query corresponding to the top level placeholder is defined by the document.

6. The method of claim 1, wherein the placeholders in the document include a parent-child relationship.

7. The method of claim 6, wherein an input type of at least some of the executable queries is defined as a function of the parent-child relationship.

8. The method of claim 1, wherein the generating the updated document is repeated at a later time using the previously retrieved mappings between the placeholders and the executable queries.

9. A non-transitory computer-readable storage medium including instructions stored thereon, that, when executed by a computer, cause the computer to:
   receive a document that includes placeholders arranged in a layout;
   read the placeholders in the document;
   retrieve executable queries corresponding to the read placeholders in the document based on mapping data stored outside of the document, the mapping data including a predefined correspondence between the placeholders and the respective executable queries;
   execute a search of a database using the retrieved executable queries to retrieve information from the database;
   map the information from the database to the layout; and
   generate an updated document that includes the information retrieved from the database arranged in a layout defined by the layout of the placeholders.

10. The non-transitory computer-readable storage medium of claim 9, wherein the instructions are further configured to cause the computer to determine a region in the document corresponding to the read placeholders.

11. The non-transitory computer-readable storage medium of claim 9, wherein the executable queries have a defined input type and a defined output type.

12. The non-transitory computer-readable storage medium of claim 9, wherein the instructions are further configured to cause the computer to identify one of the placeholders as a top level placeholder.

13. The non-transitory computer-readable storage medium of claim 12, wherein an input type of a query corresponding to the top level placeholder is defined by the document.

14. The non-transitory computer-readable storage medium of claim 9, wherein the placeholders in the document include a parent-child relationship.

15. The non-transitory computer-readable storage medium of claim 14, wherein an input type of at least some of the executable queries is defined as a function of the parent-child relationship.

16. The non-transitory computer-readable storage medium of claim 9, wherein the instructions are further configured to cause the computer to generate, at a later time, another updated document using the previously retrieved mappings between the placeholders and the executable queries.

17. A computer system comprising processing resources including at least one hardware processor and a memory, the processing resources being configured to coordinate at least:
   a receiving module that is configured to receive a document that includes placeholders arranged in a layout;
   a reading module that is configured to read the placeholders in the document;
   a first mapping module that is configured to retrieve executable queries corresponding to the read placeholders in the document based on mapping data stored outside of the document, the mapping data including a predefined correspondence between the placeholders and the respective executable queries;
   a search module that is configured to execute a search of a database using the retrieved executable queries to retrieve information from the database;
   a second mapping module that is configured to map the information from the database to the layout; and an updating module that is configured to generate an updated document that includes the information retrieved from the database arranged in a layout defined by the layout of the placeholders.

18. The computer system of claim 17, wherein the first mapping module is configured to determine regions in the document corresponding to the read placeholders.

19. The computer system of claim 17, wherein the executable queries have a defined input type and a defined output type.

20. The computer system of claim 17, wherein the first mapping module is configured to identify one of the placeholders as a top level placeholder.

21. The computer system of claim 20, wherein an input type of a query corresponding to the top level placeholder is defined by the document.

22. The computer system of claim 17, wherein the first mapping module is configured to determine a parent-child relationship of each of the placeholders.

23. The computer system of claim 22, wherein an input type of at least some of the executable queries are defined as a function of the parent-child relationship.

24. The computer system of claim 17, wherein the updating module is configured to generate, at a later time, another updated document using the previously retrieved mappings between the placeholders and the executable queries.

25. The computer system of claim 17, wherein the system includes a server and a client device including the processing resources, the processing resources further configured to communicate with the server over a network, and wherein the database and the mapping data are stored on the server.

26. The non-transitory computer-readable storage medium of claim 10, wherein at least one of the regions in the document includes a plurality of repeated placeholders.

27. The non-transitory computer-readable storage medium of claim 10, wherein at least one of the regions in the document includes a plurality of placeholders, and each of the plurality of placeholders corresponds to sub-queries that provides multiple replacements of the same placeholders in the region for generating the updated document.

28. The non-transitory computer-readable storage medium of claim 10, wherein at least one region refers to a query that returns a list of elements that are mapped to the layout and used to generate the updated document.

29. A non-transitory computer-readable storage medium including instructions stored thereon, that, when executed by a computer, cause the computer to:
  receive by the at least one processor, a document that includes placeholders arranged in a layout, the placeholders including a parent-child hierarchy with multiple levels;
  analyze the document to identify all of the placeholders in the document and an associated hierarchy of the placeholders;
  display the identified placeholders according to the associated hierarchy of the placeholders and executable database queries;
  in response to a user selection of a displayed placeholder, restrict executable database queries that are selectable for the selected placeholder;
  receive user inputs mapping one or more of the selectable executable database queries to each of the placeholders; and
  store the mapping between the placeholders and the executable database queries outside of the document.

30. The non-transitory computer-readable storage medium of claim 29, wherein the instructions further cause the computer to:
  execute a search of a database using the executable database queries in the mapping between the executable database queries, to retrieve information from the database; and
  generate an updated document that replaces the placeholders in the document with the information retrieved from the database arranged in a layout defined by the layout of the placeholders.

* * * * *